No. 606,790.  
L. J. PHELPS.  
PNEUMATIC TIRE.  
(Application filed May 11, 1897.)  
Patented July 5, 1898.

(No Model.)

Attest:  
Geo. H. Botts  
Gussie White

Inventor:  
Lucius J. Phelps  
By Phelps, Phelps & Sawyer

UNITED STATES PATENT OFFICE.

LUCIUS J. PHELPS, OF NEW BRUNSWICK, NEW JERSEY.

PNEUMATIC TIRE.

SPECIFICATION forming part of Letters Patent No. 606,790, dated July 5, 1898.

Application filed May 11, 1897. Serial No. 636,010. (No model.)

*To all whom it may concern:*

Be it known that I, LUCIUS J. PHELPS, a citizen of the United States, residing at New Brunswick, county of Middlesex, and State of New Jersey, have invented certain new and useful Improvements in Pneumatic Tires, fully described and represented in the following specification and the accompanying drawings, forming a part of the same.

Single-tube tires and some forms of double-tube tires have heretofore been secured to the wheel-rim by cement, which has been found to be very objectionable, first, on account of the difficulty and labor attendant upon cementing the tire, and, second, on account of the insecurity of the cement, so that the tire constantly breaks loose from the rim, causing the tire to creep, tearing off the air-valve, and chafing against the rim so as to destroy the tire.

The object of this invention is to provide a more simple and reliable method of securing such pneumatic tires to the rim, and I attain this object by molding or otherwise forming the tire with its inner or rim surface grooved longitudinally by an inwardly-projecting portion or fold of the tire and rendering the edges of the groove inextensible, or substantially so, in any suitable manner, as by the insertion of wires or other suitable material. The result is that when the tire is in its normal deflated condition the edges of the grooves lie close together, and in this condition the tire is easily slipped onto an ordinary crescent-shaped rim. The inflation of the tire separates the wires or other inextensible portions, forcing them up the inclined sides of the rim until they seat themselves so firmly near the edges of the rim that the tire cannot creep or be moved from its position, and the grooved portion is straightened out and pressed flat against the rim. Upon deflating the tire it assumes its normal grooved form automatically or readily and with certainty under pressure, the edges of the groove closing together and slackening the tire on the rim, so that it can readily be pushed off the rim.

In the accompanying drawings, forming a part of this specification, a construction is shown embodying the invention in its preferred form as applied to a single-tube tire, and a detailed description of the same will now be given, reference being had to the accompanying drawings, and the features forming the invention then specifically pointed out in the claims.

Figure 1:
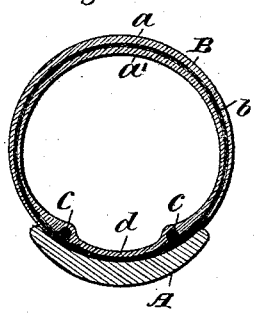
Figure 2:
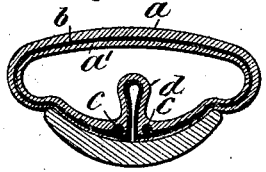

In the drawings, Figure 1 is a cross-section of the tire applied to the rim and inflated. Fig. 2 is a similar view showing the tire deflated.

Referring to said drawings, A is the rim, and B the tire, which is shown as consisting of three layers of material, the inner and outer layers of rubber $a$ $a'$ and an intermediate layer of canvas $b$, as usual in tire constructions. The tire is made inextensible, or substantially so, on the required lines by endless wire bands $c$, which are shown as embedded in the material of the tire. It will be understood, however, that the wall of the tire and the inextensible portions may be formed in any other suitable manner.

Between the wires $c$ the tire is molded or formed with a normally inwardly projecting V-shaped portion $d$, so that the wires $c$ normally lie close together, and when deflated the tire automatically or readily and with certainty under pressure folds to the form shown in Fig. 2, the wires $c$ being thus moved to the bottom of the groove in the rim, so that slack is provided for the removal of the tire from the rim, commencing on one side of the wheel, as usual in the well-known detachable tire constructions applied to and removed from the rim in this manner. When the tire is inflated, the wires $c$ are drawn outward from each other and the inwardly-projecting V-shaped portion $d$ flattened out against the rim, as shown in Fig. 1, the tire thus being held firmly upon the rim by the tightening of the wires $c$ on the edges of the rim.

It will be understood that the invention is not to be limited to tire or inwardly-projecting portion of the exact form shown, but that modifications may be made therein without departing from the invention. Neither do I limit the invention to single-tube tires, but it may be applied also to the shoe or casing of a a suitable inner-tube tire.

What I claim is—

1. A pneumatic tire made inextensible circumferentially on the opposite sides of the tire and adapted to be held upon a wheel-rim by inflation, and molded or otherwise formed with a normally inwardly projecting portion between the inextensible portions of the tire, substantially as described.

2. A pneumatic tire molded or otherwise formed with a longitudinal groove in its rim-surface formed by a normally inwardly projecting fold in the tire, and the edges of the groove rendered inextensible, substantially as described.

3. The pneumatic tire B having the endless bands c on opposite sides and having the normally inwardly projecting fold d between the bands, substantially as described.

In testimony whereof I have hereunto set my hand in the presence of two subscribing witnesses.

LUCIUS J. PHELPS.

Witnesses:
MICHAEL LYONS,
JAMES F. LYONS.